United States Patent
Fletcher et al.

[11] 3,752,986
[45] Aug. 14, 1973

[54] COMPTON SCATTER ATTENUATION GAMMA RAY SPECTROMETER

[76] Inventors: James C. Fletcher, Administrator of the National Aeronautics and Space Administration with respect to an invention of; William E. Austin, Wayne, Pa.

[22] Filed: Mar. 3, 1972

[21] Appl. No.: 231,662

[52] U.S. Cl. .................................. 250/394, 250/518
[51] Int. Cl. ................................................. G01t 1/16
[58] Field of Search ........................... 250/83.3, 83.1

[56] References Cited
UNITED STATES PATENTS

| | | | |
|---|---|---|---|
| 3,562,526 | 2/1971 | Lawson | 250/83.3 |
| 2,911,534 | 11/1959 | Brannon et al. | 250/83.3 R |
| 3,202,822 | 8/1965 | Kehlr | 250/83.3 R |
| 2,881,324 | 4/1959 | Scherbatskay | 250/83.3 R |

*Primary Examiner*—James W. Lawrence
*Assistant Examiner*—Harold A. Dixon
*Attorney*—L. D. Wofford, Jr., J. R. Manning et al.

[57] ABSTRACT

A gamma ray spectrometer system for obtaining gamma ray spectra from intense gamma field containing significant neutron flux. Spectra are maasured for a continuous gamma spectrum from about 50 Kev to 7 Mev or higher.

A radiation shield protects individual spectrometers from the incident radiation. An aperture in the shield admits a collimated radiation beam. Compton scattering targets are placed in the radiation beam to scatter part of the beam into the individual spectrometers. The targets are made changeable to control the rate at which radiation strikes the spectrometers. Two spectrometers are used, one for low energy radiation and one for high energy radiation, the axis of the low energy spectrometer is placed at a 60° angle to the radiation beam and the high energy spectrometer is placed at a 20° angle to the radiation beam. The spectrometers are rotationally symmetric and comprise an inner or "A" detector on which the radiation is incident and an outer or "B" detector which is subject to radiation scattered in detector A. The spectrometers employ sum-compton coincidence techniques to distinguish signal events from background events. The output from the A & B detectors of one spectrometer are amplified and added together to represent the entire energy released by an event. The individual amplified sigaals are also converted to bipolar waveforms. The time of the zero crossing of each bipolar waveforms is compared to determine whether the two events occurred simultaneously and are a signal event. If the events are simultaneous and the quantity of energy deposited in the B detector is of an appropriate amount, the energy representing signal is gated to a multichannel pulse height analyzer to determine the energy of the incident radiation which created the event. This information is recorded for readout and analysis. When the number of coincident events counted by a spectrometer exceeds $10^4$ per second, the Compton Scattering targets are changed to less dense ones which scatter a smaller percentage of the radiation beam and thus reduce the count rate.

3 Claims, 10 Drawing Figures

COMPTON SCATTER ATTENUATION GAMMA RAY SPECTROMETER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

FIELD OF THE INVENTION

This invention relates to the field of gamma ray spectrometers and spectrometry and more particularly to the field of gamma ray spectrometry in intense gamma radiation containing a high flux of fast neutrons, such as the radiation produced by a nuclear rocket engine.

THE MEASUREMENT ENVIRONMENT

The spectrometer of this invention is intended for measuring the gamma ray spectrum generated by a nuclear rocket engine during flight.

Figure 1:
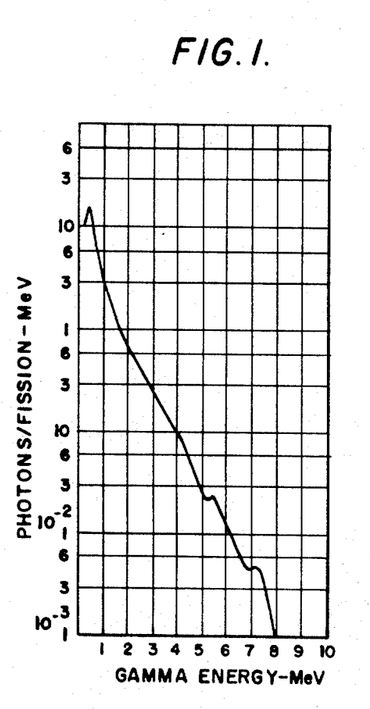
FIG. 1 is a log-plot of the number of gamma ray photons of a given energy versus energy, which is to be expected from a nuclear rocket engine which is hydrogen fueled.

The radiation field from a nuclear rocket engine has a localized source and comprises a continuous gamma ray spectrum combined with fast neutrons. FIG. 1 is a plot showing the approximate relative intensity of the gamma rays as a function of gamma ray energy which are to be expected from a nuclear rocket engine. It will be noted that the number of photons to be expected per unit time in the energy band below 1 Mev is approximately $1.5 \times 10^3$ as many as are to be expected in the 6-7 Mev range. The intensity of this radiation is as high as $7 \times 10^5$ roentgen per hour and therefore will require heavy shielding to protect the spectrometer from both the gamma rays and the fast neutrons, which are not included in the graph. However, since the spectrometer is for in-flight use, the weight of the shielding must be strictly limited to the lowest weight which allows the measurements to be effectively made.

One means of limiting the necessary shielding is to place the spectrometer above the tank which contains the liquid hydrogen fuel for the engine. When the tank is full, the liquid hydrogen provides significant shielding, although the liquid hydrogen adds thermal neutrons to the radiation flux. With the tank full, the expected flux is $10^2$ roentgen per hour.

The amount of shielding provided by liquid hydrogen decreases steadily as the tank is emptied because the attenuation of the radiation is proportional to the mass of hydrogen through which it must pass. As the shielding decreases the amount of radiation striking the spectrometer increases sharply, thus requiring that the spectrometer have a large dynamic range in order to provide accurate measurements throughout the period of engine operation from start up to shutdown. Just before shutdown the radiation flux is expected to be $7 \times 10^5$ roentgen per hour.

As the engine nears shutdown, the radiation flux at the spectrometer increases to near what it would be below the tank, however, due to the greater distance between the spectrometer and the engine it does not become as great. Also, some of the adverse effects of the radiation on the spectrometer are cumulative, so that the decreased radiation during the early part of the engine operation allows measurements to be made for the entire period of engine operation.

COMPTON SCATTERING

Compton scattering is a well-known phenomenon, but is discussed briefly for clarity in the succeeding discussion of the invention which relies heavily on Compton scattering for its effectiveness.

Figures 2, 6, 10:
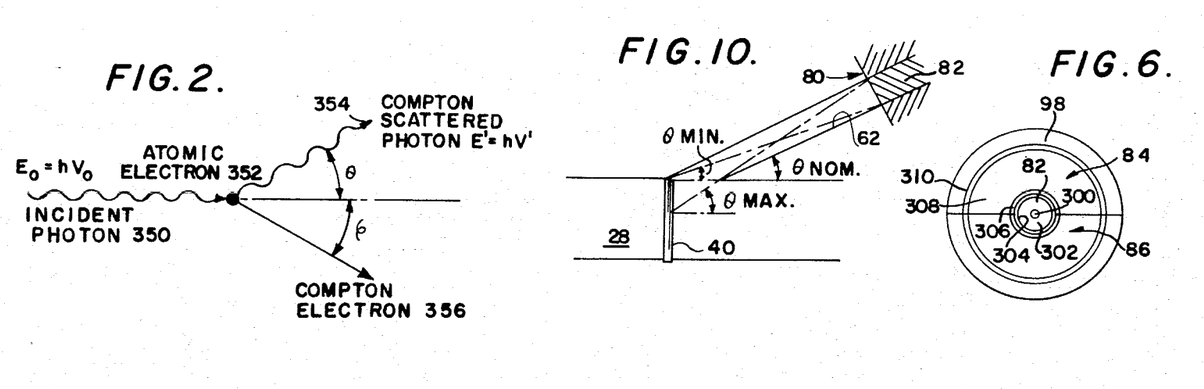
FIG. 2 shows the relationship between the incident photon, the scattered photon and the Compton electron in Compton scattering.
FIG. 6 is a section taken along line 6—6 of FIG. 3, showing the detailed structure of individual spectrometer 80.
FIG. 10 is a diagram showing the maximum and minimum scattering angle for radiation striking one of the individual spectrometers.

Compton scattering is coherent and can occur when radiation is incident on matter. An incident photon interacts with an atomic electron and is scattered at an angle $\theta$ with reduced energy, the extracted energy is carried away by the atomic electron which is ejected at an angle $\alpha$ (see FIG. 2). The ejected electron is known as a Compton or recoil electron. The energy of the incident photon $E_0$ and the scattered photon $E'$ are related by the following equation:

$$E'/E = h\nu'/h\nu_o = [1 + \alpha(1-\cos\theta)]^{-1}$$

where $\alpha$ can be derived from the expression cotangent $\theta = (1 + \alpha)$ tangent $\theta/2$.

Although the above relationships are strictly true only for free electrons, they are an excellent approximation for weakly bonded electrons when $E_0$ is greater than 50 Kev.

PRIOR ART GAMMA RAY SPECTROMETERS

One of the most common prior art gamma ray spectrometers employs a single scintillation crystal as a radiation detector. When radiation interacts with the scintillation crystal, the crystal emits visible light. The emitted light is sensed by photomultiplier tubes whose output current is a measure of the energy of the incident radiation which interacted with the crystal.

In a radiation detector comprised of a single crystal, all of the energy of the incident radiation must be absorbed within the crystal in order to obtain an accurate measurement of the energy of the incident radiation. This is because there is no way to determine what percentage of the energy was absorbed.

There are three principal ways in which radiation interacts with matter to deposit part of its energy, the first of these is through the photoelectric effect, in which an electron absorbs the entire energy of the radiation photon and is emitted as a free electron. Second is Compton scattering in which the incident photon is absorbed by an atomic electron and a lower energy photon and the electron are emitted. Third, is pair production in which a position electron pair is created. Each of these interactions deposits a different percentage of its initial energy in the crystal unless the radiation is completely absorbed, i.e., the products of the initial interaction are absorbed.

In order to absorb all the energy of an interacting radiation photon, a single scintillation detector must have a crystal large enough to absorb the reaction products of the initial interaction. The large volume required for this type of scintillation detector has two disadvantages from the point of view of space use. First, fast neutrons which break through the shielding have relatively large probabilities of interacting with the crystal because of its large volume. This large probability requires that a larger percentage of the neutrons be eliminated by the shielding. This leads to the second disadvantage. Large quantities of shielding must be used to prevent the incident radiation from swamping the detector and its electronics. Without the additional shielding there would be enough neutron interactions to mask the information which is to be derived from the gamma radiation.

Therefore, the shielding required for large single crystal scintillation radiation detectors is too heavy for space flight use.

A further objection to scintillation detectors for measuring the spectrum of the nuclear rocket engine is the almost non-existent response of scintillators to radiation having an energy of less than 100 Kev. From FIG. 1 it can be seen that a significant portion of the gamma radiation has an energy of less than 100 Kev.

Semiconductor detectors have been developed in which Lithium is drifted into the semiconductor. These detectors are designated $Ge(Li)$ and $Si(Li)$ in accordance with whether they are made of germanium or silicon respectively. These detectors, when reverse biased at about 500 volts, provide tens of cubic centimeters of intrinsic material sandwiched between a p-type layer and an n-type layer. Radiation interacts in the intrinsic region to generate hole-electron pairs (to be distinguished from pair production interactions in which positron-electron pairs are produced). The number of hole-electron pairs produced by an interaction is proportional to the energy absorbed by the detector. The holes and electrons, once generated, migrate toward the appropriate electrodes, holes moving toward the negative electrode and electrons moving toward the positive electrode. The charge carried by the holes and electrons is collected at the electrodes and is proportional to the energy absorbed by the detector.

These single crystal semiconductor detectors suffer from a size problem similar to the single crystal scintillation detectors in that they must absorb all of the energy of the incident radiation in order to produce accurate spectral information. These detectors suffer from problems similar to the single crystal scintillation detectors, except that they are more dense and thus require less volume to absorb all the energy of the incident radiation. This reduced volume reduces the amount of shielding needed to protect the detectors from the incident radiation.

Two types of gamma ray spectrometers have been developed to overcome the problem of the single crystal detector which requires it to absorb all the energy from the incident radiation in order to obtain accurate energy spectrum information. These spectrometers employ two detectors in close proximity and either coincidence or anti-coincidence techniques to select a single type of radiation-crystal interaction to use in determining the energy of the incident radiation.

For clarity in the following discussion, a spectrometer sensor employing two detectors will be referred to as a two detector spectrometer and the spectrometer system of this invention will be referred to as a spectrometer system.

The two-detector spectrometers which employ anti-coincidence circuitry selectively discriminate against Compton scattering by rejecting all pulses which occur simultaneously with a pulse from the other detector.

Two detector spectrometers which employ coincidence circuitry selectively choose those reactions of the Compton type and reject other types. These spectrometers are deferred to as Sum Compton spectrometers. The usual approach to the construction of a two detector spectrometer is to employ a small detector as a target for an incident beam of radiation, while surrounding this detector with a larger detector which is shielded from the beam of radiation. The small detector is generally referred to as the "primary" or "A" detector, while the shielded detector is referred to as the "secondary" or "B" detector. The designations of the detectors as primary and secondary is adopted, since with perfect shielding only radiation which has interacted in the primary detector will be incident on the secondary detector.

In a sum-Compton spectrometer an event is a signal event which it is desired to record, when a photon is Compton scattered by detector A such that the scattered photon is absorbed, or loses all its energy in detector B. This process produces electrical pulses simultaneously in both detectors. The output pulses of the detectors are electronically analyzed to determine which correspond to desired events (i.e., simultaneous pulses in both detectors). The energy absorbed in each detector from a desired event is added together and recorded as a data point for the spectrum.

Both anti-coincidence and sum-Compton spectrometers are an improvement over single crystal spectrometers, because they can be much smaller, since they need not absorb all the energy of the incident photons. With two detector spectrometers, it is sufficient if all the energy from the selected type of interaction is absorbed. In the event that perfect absorption is not realized, an uncertainty is introduced in the spectrum being measured, since some high energy events will be recorded as being of lower energy.

A significant disadvantage of two detector spectrometers is that they are normally very inefficient, accepting only about 1 percent to 5 percent of the radiation events as signal events.

However, despite these improvements over the single crystal detectors, no spectrometers have been developed which can provide accurate gamma ray spectral information while operating in a radiation beam as intense as that from a nuclear rocket engine.

SUMMARY OF THE INVENTION

It is a primary object of the present invention to measure the gamma ray spectrum of a nuclear rocket engine during flight.

Another object of the invention is to measure the gamma ray spectrum of a radiation flux which includes many fast neutrons.

Another object of the present invention is to maintain individual spectrometer count rates between 500 per second and 10,000 per second while measuring the intensity of a gamma ray field whose intensity varies over a 7,000 to 1 range.

Another object is to measure a continuous intense gamma ray spectrum in which the energies of interest extend from 50 Kev to 7 Mev or more.

Another object of the invention is to reduce the intensity of a gamma ray spectrum to measurable intensity levels, where the flux is too intense to control simply by limiting the radiation incident on the spectrometers to a small cross-section.

A further object is to provide an improved sum-Compton gamma ray spectrometer system for use in fast neutron environments.

A still further object is to provide a novel method of measuring intense gamma rays.

The above and other objects which will become apparent hereinafter are accomplished by this invention providing a spectrometer system in which entire individual sum-Compton spectrometers are shielded from direct exposure to the radiation to be measured. This is accomplished by employing a tungsten radiation shield. The radiation shield is provided with a hollow bore for admitting a collimated radiation beam.

The spectrometer system of this invention employs two individual sum-Compton spectrometers to obtain spectral data over the full energy range from 50 Kev to 7 Mev or more. The two spectrometers are located within the tungsten shield and out of the collimated radiation beam which is admitted by the bore in the shield.

Two scattering targets, one for each individual spectrometer, are located in the path of the collimated beam to scatter a portion of the radiation toward the spectrometers. The targets are located on discs which can be rotated by a stepping motor to change the targets of different scattering cross-sections in order to reduce the scattering efficiency of the targets as the incident radiation beam becomes more intense and thereby control the number of events per second occurring in the spectrometers.

The scattered radiation is collimated by secondary bores in the shield each of which lead from the main bore in the vicinity of a scattering target to the corresponding individual spectrometer.

A first of the individual spectrometers is made responsive primarily to low energy radiation by requiring that radiation scattered toward it be scattered through a 60° angle. The scattering target which scatters radiation to this spectrometer is the first target encountered by the radiation beam.

The second individual spectrometer is made primarily responsive to high energy radiation by requiring that the radiation incident on it be scattered through only a 20° angle. Most of the low energy radiation deflected toward this spectrometer is filtered out by a lead filter located between the scattering target and the spectrometer. Dense scattering targets can be used for this spectrometer because absorption of low energy radiation is not a problem since the low energy information is extracted from the beam upstream of this scattering target.

Semiconductor detectors are employed in each individual spectrometer in preference to scintillation detectors because their higher density allows them to be smaller, thus reducing shielding requirements as well as providing better energy resolution and eliminating the need for photomultiplier tubes.

As is standard practice with semiconductor detectors, a cryostat is provided to cool the spectrometers, since presently available detectors must be operated at low temperatures to prevent dedrift of the lithium.

The charge pulses from the A and B detectors of an individual spectrometer are separately amplified by the electronics. Unipolar versions of the both pulses are added together and delayed. The individual unipolar pulses are converted to bipolar waveforms and the zero crossings of these waveforms are compared to determine whether the pulses are simultaneous enough to correspond to desired signal events. For those pulses corresponding to signal events the added and delayed unipolar waveforms are gated to a multichannel pulse height analyzer. At the end of each measurement interval, the spectral information derived by the pulse height analyzer can be sent back to earth by telemetry. When the signal event count rate exceeds $10^4$ per second, the scattering targets are switched to less dense targets to reduce the count rate by a factor of twenty.

DESCRIPTION OF THE PREFERRED EMBODIMENT

A gamma ray spectrometer in accordance with this invention employs a radiation shield (shown generally at 20 in FIG. 1) as a housing for the individual spectrometers and scattering targets.

Figure 3:
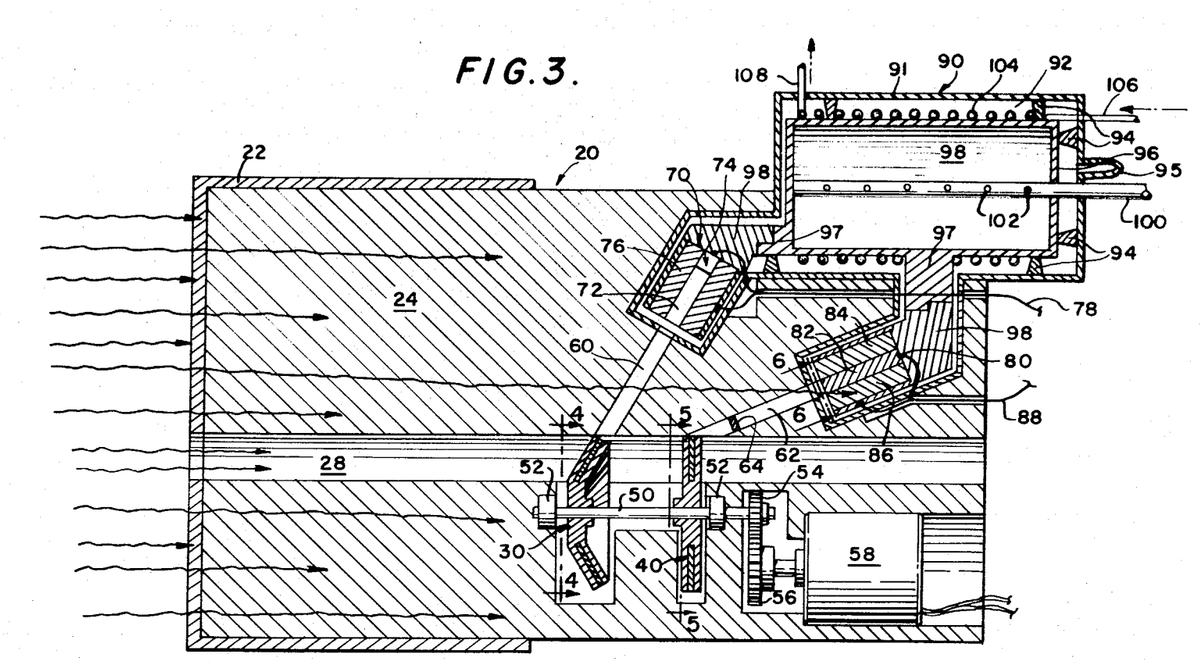
FIG. 3 is a section through the middle of a gamma ray spectrometer system built in accordance with this invention.

Radiation shield 20 is comprised of two layers, the first is a thermal neutron shield 22 made of boron which has a large absorption cross-section for thermal neutrons and therefore stops almost all of the thermal neutrons. This layer is terminated short of the detectors to prevent it from being a source of gamma rays which could strike the detectors.

The second shield layer 24 forms the main body of the shield and is preferably comprised of tungsten or an alloy of tungsten and other heavy metals. Tungsten is preferred as the major constituent of this layer because it is the densest of the non-radioactive heavy metals which are readily available. Shield 24 attenuates the fast neutron and gamma ray flux to tolerable levels at the detector locations. A depth of about 25 cm of tungsten must be used if accurate measurements are to be taken throughout a flight.

An aperture or bore 28 through both shield layers admits a collimated radiation beam a few cm in diameter. Two scattering target holders 30 and 40 are positioned to hold scattering targets within the bore. Each target holder contains three different targets and a vacant space having no target. Target holders 30 and 40 are rigidly attached to an axle 50 which is supported in the tungsten shield 24 by a pair of bearings 52. A gear 54 is rigidly attached to axle 50 and is driven by a stepper motor 58 through drive gear 56. Stepping of the motor thus rotates axle 50 and target holders 30 and 40, thereby changing which scattering targets are positioned in the path of the radiation beam in bore 28.

A low energy spectrometer 70 is connected to bore 28 in the vicinity of target holder 30 by a bore 60. This bore is approximately 0.75 cm in diameter and 4 cm long. Bore 60 preferably intersects bore 28 at a 60° angle, thus limiting the scattered radiation incident on the spectrometer to a maximum energy of 1 Mev, since that radiation has been scattered through 60° (see FIG. 2).

Individual spectrometer 70 is a sum-Compton spectrometer which is preferably cylindrical and has its axis colinear with the axis of bore 60. A hollow bore 72 on the axis of spectrometer 70 is aligned with bore 60 and is large enough in diameter (0.75 cm) to prevent any radiation incident from a target on holder 30 from striking the surrounding detector region 76. At the end of bore 72 distant from target holder 30 is a detector region 74. Detector region 74 is preferably silicon or a silicate to allow scattered low energy photons to escape from detector A into detector B in order to create a sum-Compton signal event. The region 74 is made short to limit neutron recoil events which have higher energy levels in silicon than in germanium. The outer detector region 76 is preferably germanium because its greater density allows it to be small and still absorb the energy of the photons scattered from detector A into it. This individual spectrometer is 2 cm long, with an outer diameter of 1.5 cm. The inner detector region is 0.75 cm in diameter by 0.5 cm long. The detailed internal structure of spectrometer 70 will be discussed below in connection with FIG. 6.

A high energy individual spectrometer 80 is connected to bore 28 in the vicinity of target holder 40 by a bore 62 which preferably forms a 20° angle with bore 28. Bore 62 is 0.75 cm in diameter and 6 cm long. Radiation incident on detector 80 from a target in holder 40 has been scattered through a 20° angle. A 1 cm thick lead filter 64 is located within bore 62 to preferentially attenuate low energy scattered radiation to prevent large numbers of low energy radiation interactions in detector 80 from swamping the less frequent high energy interactions. The effectiveness of this filter can be seen from Table I below.

TABLE I

| Gamma Energy | Percentage of Flux Below Listed Energy | |
|---|---|---|
| | Unfiltered | Filtered |
| 0.1 Mev | 7 % | 0 % |
| 0.2 | 16.4 % | 0 % |
| 0.3 | 35.2 % | 0.4 % |
| 0.4 | 47.0 % | 2.4 % |
| 0.5 | 56.4 % | 6.8 % |
| 0.6 | 63.4 % | 11.5 % |
| 0.7 | 69.3 % | 22.2 % |
| 0.8 | 74.6 % | 28.0 % |
| 0.9 | 78.1 % | 31.6 % |

Only 22 percent of the unfiltered flux is above 0.9 Mev in energy which is the energy range of interest for the high energy spectrometer 80. After filtering, 68 percent of the flux is above 0.9 Mev. Thus the filtering increases the percentage of the flux which is of interest by a factor of 3 and allows more desired interactions to occur for recording the energy of gamma rays of interest without swamping the detectors with undesired interactions.

Spectrometer 80 is preferably cylindrical and has a central detector region 82 extending the full length (2 cm) of the spectrometer and having a large enough diameter (0.75 cm) to assure that no scattered radiation from a target in holder 40 will strike outer detectors 84 and 86. Outer detectors 84 and 86 are symmetric and are each one half of a hollow cylindrical tube having an outer diameter of 1.5 cm and an inner diameter of 0.75 cm and being 2 cm long.

Outer detector regions 84 and 86 will intercept pair production products, and the existence of simultaneous pulses in each of these detectors will indicate the presence of a pair production event. If pair production events are not of interest, then a single outer detector can be used as in spectrometer 70. All detector regions 82, 84 and 86 are preferably germanium, because its high density assures maximum radiation absorption in a minimum volume.

The detailed preferred internal structure of spectrometer 80 is shown in FIG. 6 which is a plan view of the end of the spectrometer seen looking from target holder 40. Inner detector 82 is comprised of three separate regions, a central core 300, a main body 302 surrounding core 300 and an outer layer 304. Core 300 is one of the electrodes of detector 82 and is surrounded by a p-type Ge layer which is merged into it in the Figure. Region 302 is formed by lithium drift and is intrinsic material when the detector is reverse biased for operation. Outer layer 304 is a germanium n-type region. The second detector electrode is attached to n-type 304.

Outer detector regions 84 and 86 are similar. Inner layer 306 is p-type germanium and is attached to an electrode. Main region 308 is intrinsic when reversed biased and is formed by lithium drift. Outer region 310 is n-type germanium and has an electrode attached to it. The spectrometer's outer cylindrical surface is surrounded by, but insulated from tungsten shield 98. As noted above detectors 84 and 86 can be a single detector is desired.

Spectrometer 70 is similar to detector 80, except that there is a single outer detector and the inner detector is silicon.

A cryostat shown generally at 90 is provided to maintain the spectrometers at their proper operating temperatures.

Cryostat 90 comprises an outer aluminum vacuum bottle wall 91 which encloses the individual spectrometers and the rest of the cryostat. An inner aluminum vacuum wall 96 is supported by projections 94 from outer wall 91 as in standard vacuum bottle practice. A vacuum cavity 92 is between the walls 91 and 96. Inner wall 96 encloses a inner cavity 98 which is vented by a tube 100 which extends through walls 91 and 96. Tube 100 extends the length of cavity 98 and has a plurality of apertures 102 in its wall for communicating with cavity 98. The inner wall 96 has two solid projections which extend out toward spectrometers 70 and 80. These projections are intimately bonded to tungsten extensions which surround the spectrometers on all sides except the end facing the corresponding scattering target. These extensions are made of tungsten to attenuate any radiation scattered toward the detectors by the cryostat which extends beyond radiation shield 20 and into the radiation field.

A cooling coil 104 for use in cooling cavity 98 extends the length of inner cavity 98 within the vacuum cavity 92 formed by inner and outer vacuum bottle walls 91 and 96.

Figure 8:
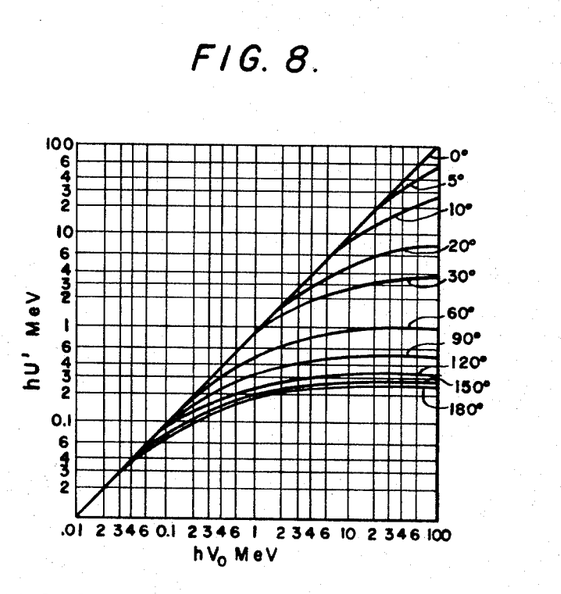
FIG. 8 is a log-log plot of the energy of Compton scattered photons as a function of the energy of the incident photon and the angle of scatter.

As indicated above, Compton scattering is used to deflect the collimated radiation beam from bore 28 toward the individual sum-Compton spectrometers where Compton events within the two detectors comprising the sum-Compton spectrometers are recorded as signal events. Thus, the radiation incident on the spectrometers has already undergone a Compton scattering event in the corresponding scattering target located on bore 28. The Compton event which takes place in the bore 28 reduces the energy of the photon striking the spectrometer. This energy reduction is known as the Compton Energy Shift. FIG. 8 is a log-log plot of the energy of the scattered Compton photon versus the incident photon energy and the angle of scatter. Thus, the energy of the original photon can be obtained from the energy of the scattered photon and a knowledge of the angle of scatter.

For each individual spectrometer, $\theta$ has a prescribed range of possible values. As shown in FIG. 10, $\theta$ max and $\theta$ target, are both determined by the geometric relationships among the targetm the diameter and length of the "scattered" bore 62 and the angle between incident bore 28 and scattered bore 62. To obtain good energy resolution, the variation of $\theta$ about its nominal value $\theta$ nom must be kept small. $\theta$ for the two spectrometers of this invention varies $\pm 3°$ about the nominal values of 20° and 60°.

Figure 9:
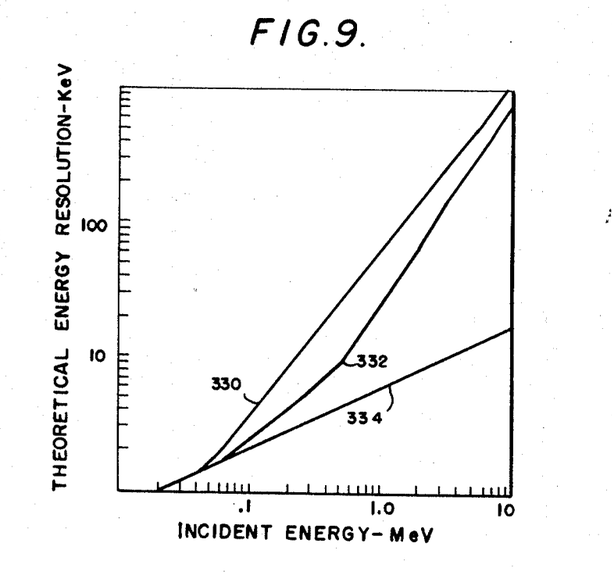
FIG. 9 shows the theoretical energy resolution of the two individual sum-Compton spectrometers and their intrinsic resolution.

The energy resolution of each spectrometer is shown in FIG. 9 where the low energy spectrometers resolution is shown by curve 330, the high energy spectrometer's resolution is shown by curve 332 and the intrinsic energy resolution (i.e., for radiation which has not been scattered) of the spectrometers is shown by curve 334.

Figure 4:
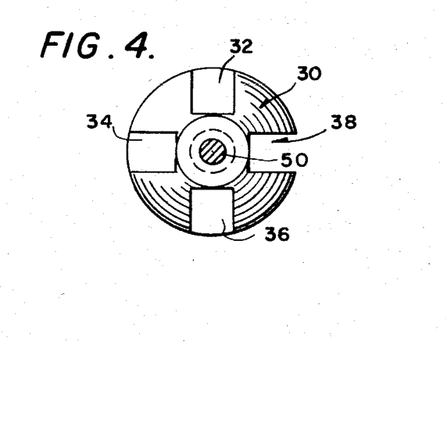
FIG. 4 is a section taken along line 4—4 of FIG. 3, showing scattering target 30.
Figure 5:
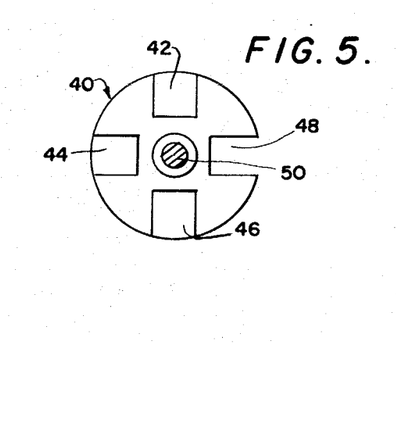
FIG. 5 is a section taken along line 5—5 of FIG. 3, showing scattering target 40.

The scattering targets holders 30 and 40 hold three targets each 32, 34, 36 and 42, 44 and 46, respectively, and also have a vacant target location, 38 and 48 respectively. The area atomic density of the targets in each set of targets varies over a range of 400 to 1 thus, if targets 32 and 42 are the thinnest target in each set, then targets 34 and 44 are twenty times as dense respectively, and targets 36 and 46 are 400 times as dense as 32 and 42 respectively or 20 times as dense as 34 and 44 respectively. The area atomic density of a target is the number of atoms per square centimeter of surface area.

The scattering cross-section of a target varies directly as its area density and the quantity of radiation scattered by a target is directly proportional to its scattering cross-section. Therefore, if successive targets in a set are used, the quantity of scattered radiation will decrease by a factor of 20 each time the target area atomic density decreases by a factor of 20.

Scattering target 32 is preferably 0.004 cm thick mylar, target 34 is preferably 0.025 cm thick graphite and target 36 is preferably 0.5 cm thick graphite. Scattering target 42 is 0.006 cm thick graphite, target 44 is 0.0175 cm thick copper, and target 46 is 0.35 cm thick copper. These materials and thicknesses for the scattering targets provide the desird steps in scattering cross-section which controls the quantity of scattered radiation and thus, the number of events occurring in the primary (A) detectors each second. As the engine consumes fuel causing the shielding from liquid hydrogen to decrease and the radiation intensity to increase, progressively less dense targets are placed in bore 28 to maintain the coincident event rate in the spectrometers between 500 and 10,000 per second despite an 8,000 to 1 change in radiation intensity. Larger changes in intensity can be controlled by using more targets or varying the target densities by a factor larger than 20.

Figure 7:
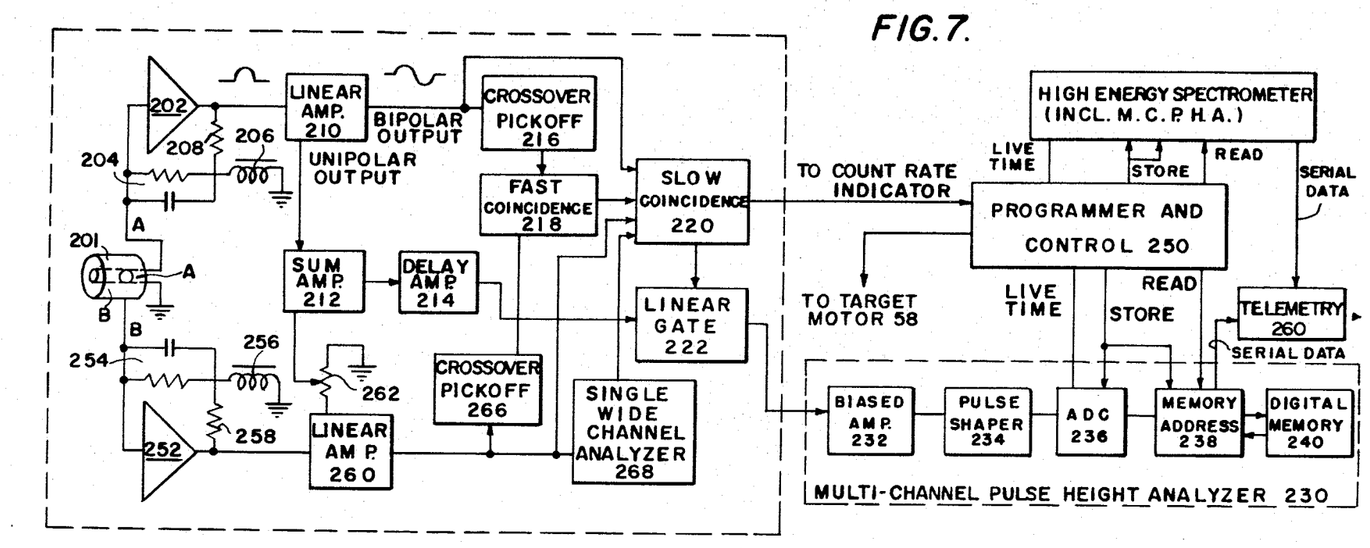
FIG. 7 is a schematic circuit diagram showing the electronics of the complete spectrometer system.

The electronics for analyzing the pulses from the detectors to determine which correspond to Compton events which it is desired to record are shown in FIG. 7. The circuit shown in an a.c. circuit with biasing circuits and blocking capacitors not shown. A sum-Compton spectrometer is shown at 200 and is comprised of a single A detector and a single B detector. When an event creates an electric pulse in detector A, the pulse is coupled to the input of amplifier 202 which uses a field effect transistor (FET) to produce an output voltage proportional to the charge at the input. RC network 204, resistor 208 and delay line 206 constitute a feedback loop around amplifier 202 which has a high input impedance. The reflection of the pulse from shorted delay line 206 terminates the input to amp 202 after $5 \times 10^{-7}$ seconds. This cut-off time is chosen because the charge collection time of the detectors is about $2 \times 10^{-7}$ seconds.

The output of amp 202 is fed to a linear amp 210 having two outputs, one unipolar and one bipolar. The unipolar output is connected to one input of a sum amplifier 212. The output of sum amplifier 212 drives a delay amplifier 214 The bipolar output of linear amp 210 feeds the input of a fast crossover pickoff circuit 216 whose output goes to one input of a fast coincidence circuit 218. The bipolar output is also fed to a slow coincidence circuit 220.

An output pulse from the B detector follows a path similar to that of the A detector pulse. Thus, the charge in the pulse is converted to voltage by amp 252 (similar to 202) and amplified by linear amp 260 (similar to 210) whose unipolar output is fed to an energy normalizing potentiometer 262 and thence to the second input of sum amp 212. The bipolar output of linear amp 260 drives a fast crossover pickoff circuit 266 (similar to 216) whose output is connected to the other input of fast coincidence circuit 218. Fast coincidence circuit 218 provides a resolution of $10^{-7}$ seconds on the fast coincidence. The bipolar output of amp 260 also drives a single channel analyzer 268 which determines whether the pulse is of a desired energy level. Since analyzer 268 is in the B detector channel, the energy deposited must be a value which could be deposited in the B channel by radiation of interest.

From FIG. 8 we can determine the maximum energy which can be deposited in the B detector by radiation of interest, since the maximum initial energy of the radiation of interest in the low energy spectrometer is 1 Mev. From FIG. 8, we determine that the maximum energy of the scattered photon which strikes the spectrometer is 0.5 Mev, since it was scattered through 60°. The minimum energy of interest is about 40 Kev, since incident rays having an energy of 50 Kev suffer almost no loss of energy in being scattered 60°but in order for the B detector to absorb all the energy of the photon scattered by the A detector, it must absorb 40 Kev or more. Therefore, the energy range of interest for the low energy spectrometer is 40 Kev to 500 Kev.

The output of analyzer 268 and the bipolar output of amp 260 both form inputs to the slow coincidence circuit 220.

Sum amp 212 adds the voltage received at its two inputs so that its output voltage is proportional to the total energy absorbed by detectors A & B at that time, since the voltage is proportional to the charge which is proportional to the energy absorbed.

If the crossover pickoff circuits 216 and 266 provide simultaneous outputs indicating that events took place in both detectors simultaneously, then the fast coincidence circuit 218 provides an output which forms an enabling input to show coincidence circuit 220.

Analyzer 268 provides a second enabling input to slow coincidence circuit 220. When enabled by both fast coincidence 218 and analyzer 268, slow coincidence circuit 220 determines from its two bipolar inputs how long a time is needed to pass the energy from the two pulses. One output of slow coincidence circuit 220 turns on a linear gate 222 thus, allowing the output of delay amp 214 to reach the input of a multichannel pulse height analyzer 230. A second output from slow coincidence circuit 220 provides a pulse for driving a count rate circuit in the programmer and control unit 250. Multichannel, pulse height analyzer (MCPHA) 230 comprises a biased amp 232 which passes only those signals corresponding to energies greater than a predetermined minimum level, 50 Kev for the low energy spectrometer and 500 Kev for the high energy one. Pulse shaper 234 stretches the pulse to allow them to be more accurately analyzed. Analog-to-digital converter (ADC) 236 converts the analog value of the input pulse to a digital number which is passed by memory address unit 238 into a digital memory 240 for storage. ADC 236 receives real time information and store signals from control 250. On command from control 250 the data in the digital memory is fed serially to a telemetry system 260 for transmission back to earth.

The high energy spectrometer 270 is similar to the low energy spectrometer and is controlled by the same control unit 250.

When the number of counts per second exceeds a predetermined value, control 250 advances stepping motor 58 to change scattering targets.

OPERATION

We will now follow a test flight from start to finish to illustrate the operation of the invention.

During preparation for the flight, the detectors must be kept at safe storage temperatures. As explained above, these temperatures are in the neighborhood of −77° K or below. To accomplish this task, liquid nitrogen is pumped through cooling coil 104 thus, chilling inner cavity 98 to about −200° K. Thereupon, carbon dioxide gas is pumped into vent 100. The $CO_2$ gas spreads into cavity 98 through apertures 102. Upon contacting the cold wall 96 which forms cavity 98, the $Co_2$ solidifies. The solid $Co_2$ is built up until it encompasses the entire volume of inner cavity 98. The liquid nitrogen flow is maintained until just before launch. There is enough solid $Co_2$ in the cryostat to keep the detectors cold until after the end of the gamma ray measurement period unless a particularly long time is to elapse. If a particularly long period of time will elapse prior to the completion of the gamma measurements, inlet 106 of coil 104 can be connected to the liquid hydrogen tank's vent to prolong the cooling of the detectors.

The scattering targets are initially set so that the most dense targets (36 and 46) are in the bore ready to scatter the radiation.

The spectrometer system is energized prior to ignition of the nuclear engine so that the acquired data will cover the entire period of engine operation.

When the nuclear engine starts, the radiation to be measured begins. The radiation beam coming down the bore in the shield is scattered by the two scattering targets and some of the scattered radiation interacts with the corresponding detector.

Now, referring to the low energy spectrometer, (the high energy one behaves similarly) if a photon interacts in detector A and not in detector B, then a pulse will appear at the A detector output and will be amplified by amplifiers 202 and 210. The sum amplifier's output will be equal to the unipolar output of amp 210 multiplied by the gain of sum amplifier 212, since no input is received from the B channel since no pulse was produced by the B detector. Crossover network 216 will provide an output to fast coincidence circuit 218, when the crossover of the bipolar output of linear amp 210 is detected. Since no pulse is traveling in channel B, no corresponding input is received from the B channel crossover pickof 266 and fast coincidence circuit 218 produces no output. Therefore, slow coincidence circuit 220 and linear gate 222 are not enabled and the output of delay amp 214 does not reach the multichannel pulse height analyzer.

Now, if a photon interacts in detector A and is Compton scattered such that the Compton electron is absorbed in detector A and the scattered photon is absorbed in detector B, both detectors will produce outputs vertually simultaneously. After amplification, both pulses will arrive at the inputs to sum amplifier 212 where they are added and amplified. Amplified bipolar versions of the two pulses drive the crossover pickoff circuits 216 and 266 which produce simultaneous outputs. The simultaneous pulses from the crossover networks trigger fast coincidence circuit 218 to provide an enabling output to slow coincidence circuit 220. Assuming the scattered photon deposited a quantity of energy in detector B which corresponds to a desired energy level (between 40 Kev and 500 Kev for the low energy spectrometer), analyzer 268 will also provide an enabling input to slow coincidence circuit 220. Having been enabled, slow coincidence circuit 220 produces a gate control pulse having a duration corresponding to the period when the desired energy information for the pulses should be present in the output of delay amp 214. The gate control signal opens linear gate 222 to transmit the output of delay amp 214 to the input of the multichannel pulse height analyzer 230. The slow coincidence circuit also produces a count rate pulse. Count rates pulses are counted in the control unit 250 to determine the rate at which pulses are being received.

Within multichannel pulse height analyzer the pulse from linear gate 222 is amplified by biased amp 232, stretched by pulse shaper 234 and converted by ADC 236 to a digital number specifying the energy of the corresponding incident photon. This number is then stored in digital memory 240 until control unit 250 calls for it to be transmitted to the telemetry system.

When the coincident count rate exceeds $10^4$ per second, control unit 250 fires the stepper motor to switch in the next set of scattering targets. Since these targets are less dense and therefore have smaller scattering cross-sections, these targets scatter a smaller portion of the radiation beam toward the spectrometers. Because of the density choosen in this example, the amount scattered into the detectors is reduced by a factor of 20 for each detector and the singles count rate drops by a factor of 20 for each detector. This prevents the occurrance of an excessive percentage of random coincidences. It will be appreciated that the probability that a neutron will produce either a fast or slow random coincident pulse increases as the number of pulses per second in the A detector increases, since the percentage of time when no pulse is present in the A detector decreases continuously.

As shutdown of the nuclear engine approaches, the liquid hydrogen tank approaches empty and the neutron shielding which has been provided by the liquid hydrogen dissipates causing a rapid increase in both the gamma and neutron flux. As the neutron flux increases, the leakage through the radiation shield increases resulting in a steady increase in non-signal events in detector B and adversely effects the energy resolution of the spectro-meter. This effect can be decreased by increasing the length of the radiation shield between the radiation source and the detectors, but this drastically increases the weight of the spectrometer and is not felt to be worthwhile.

At periodic intervals a measurement of the background radiation is obtained by energizing stepping motor 58 to position the vacant target locations 38 and 48 in bore 28. Under these conditions no radiation is scattered toward the detectors from bore 28 and only leakage radiation (neutrons and gamma rays) interact with the detectors.

Data is preferably radioed back to earth at the end of each 5 second counting cycle. This short counting period is employed to provide a statistically significant reading of the gamma ray spectrum for each period of the motor's operation.

When data is to be radioed back to earth, control 250 sends a read pulse to the digital memories and the data is sent to telemetry unit 260 in serial form for transmission to earth.

Several types of interactions in detectors A and B can cause non-desired events to be recorded as desired events. Unrelated interactions can take place simultaneously in the separate detectors. Such interactions can result from a neutron penetrating the radiation shield and interacting in detector B while a gamma photon or another neutron is interacting in detector A. This type of event is referred to as random coincidence and results in a false event being recorded, if the two interactions take place synchronously enough that fast coincidence circuit 218 is triggered and if an appropriate amount of energy is deposited in detector B. Even if the two events do not occur synchronously enough that the fast coincidence circuit is triggered by them, the energy from the neutron event will be added to and treated as part of a signal event's energy if the neutron interaction and the signal event are synchronous enough that the energy from the neutron event is within the portion of the delay amplifier's output which is gated to the multichannel pulse height analyzer 230. These two different phenomena can be called fast random coincidence and slow random coincidence respectively.

Once the energy spectrum of the radiation incident on the individual spectrometers has been obtained, it must be analyzed to determine the energy spectrum of the radiation field. This can be done in several ways. First, the actual response of the spectrometer system to gamma rays of known energies can be determined and used to generate a conversion table specifying conversion factors to be used in converting the data for each energy band to a true energy band of the original radiation field.

Second, the energy shift and efficiency of the spectrometer can be calculated on the basis of scattering cross-sections and the Compton energy shift for the different spectrometers. The energy shift and efficiency can then be used to determine the radiation field's spectrum from the energy spectrum of the radiation incident on the spectrometers.

It will be understood by those skilled in the art that while this invention has been desccribed in terms of its preferred embodiment, many variations can be made without departing from the spirit and scope of the invention. Thus, the various dimensions and angles may be changed if desired. Although not preferred, detectors other than semiconductor detectors can be employed.

What is claimed is:

1. A radiation spectrometer system for use in an intense radiation field, comprising:
    radiation shield means for creating a shadow zone in the radiation field; said radiation shield means having an aperture for allowing a collimated beam to penetrate the shield;
    detection means within the shadow zone of the radiation field for sensing the energy of radiation incident on the detection means, said detection means comprising a plurality of sensing means, each primarily responsive to a different energy band than the others, said sensing means being positioned so that the lower the energy band to which it responds, the greater the scattering angle of the radiation incident on it;
    deflecting means within the aperture in the radiation shield for deflecting a portion of the collimated radiation beam into the detection means, said deflecting means comprising scattering means for Compton scattering the incident radiation beam to deflect a portion of it into the detection means at a reduced energy; and
    collimating means for restricting the scattered radiation incident on the detection means to a narrow collimated beam to restrict the angle of scatter of the radiation incident on the detection means to a known range of angles to enable an energy shift to be calculated.

2. The apparatus of claim 1 wherein the scattering means comprises:
    a different scattering target for each sensing means, whereby the scattering efficiency of the target can be adjusted in accordance with the relative intensity of the energy band to which the sensing means responds, whereby the count rate for the different sensing means may be equalized.

3. The apparatus of claim 1 wherein filtering means are provided between the scattering means and at least one of the sensing means to preferentially attenuate at least some of the radiation outside the energy band to which the one sensing means responds.

* * * * *